US006623380B2

(12) United States Patent
Jordan

(10) Patent No.: US 6,623,380 B2
(45) Date of Patent: Sep. 23, 2003

(54) GOLF BALL CORE COMPOSITION HAVING COPPER

(75) Inventor: Michael D. Jordan, East Greenwich, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/825,877

(22) Filed: Apr. 4, 2001

(65) Prior Publication Data

US 2002/0173381 A1 Nov. 21, 2002

(51) Int. Cl.[7] .......................... A63B 37/04; A63B 37/06; A63B 37/00
(52) U.S. Cl. ......................... 473/372; 473/371; 473/351
(58) Field of Search ................................. 473/351–377

(56) References Cited

U.S. PATENT DOCUMENTS

| | | |
|---|---|---|
| 4,056,269 A | 11/1977 | Pollitt et al. |
| 4,065,537 A | 12/1977 | Miller et al. |
| 4,076,255 A | 2/1978 | Moore et al. |
| 4,165,877 A | 8/1979 | Miller et al. |
| 4,264,075 A | 4/1981 | Miller et al. |
| 4,688,801 A | 8/1987 | Reiter |
| 4,852,884 A | 8/1989 | Sullivan |
| 4,863,167 A | 9/1989 | Matsuki et al. |
| 5,093,402 A | 3/1992 | Hashimoto et al. |
| 5,104,123 A | 4/1992 | Okitsu et al. |
| 5,143,957 A | 9/1992 | Hashimoto et al. |
| 5,779,561 A | 7/1998 | Sullivan et al. |
| 5,779,562 A | 7/1998 | Melvin et al. |
| 5,833,553 A | 11/1998 | Sullivan et al. |
| 5,876,294 A | 3/1999 | Yamagishi et al. |
| 5,879,244 A | 3/1999 | Hwang |
| 5,971,870 A | 10/1999 | Sullivan et al. |
| 5,998,506 A | 12/1999 | Nesbitt |
| 6,015,356 A | 1/2000 | Sullivan et al. |
| 6,018,003 A | 1/2000 | Sullivan et al. |
| 6,083,119 A | 7/2000 | Sullivan et al. |
| 6,102,815 A | 8/2000 | Sutherland |
| 6,117,025 A | 9/2000 | Sullivan |
| 6,121,357 A | 9/2000 | Yokota |
| 6,123,629 A | 9/2000 | Yamaguchi et al. |
| 6,126,559 A | 10/2000 | Sullivan et al. |
| 6,129,640 A | 10/2000 | Higuchi et al. |
| 6,136,906 A | 10/2000 | Sano |
| 6,149,536 A | 11/2000 | Sullivan et al. |
| 6,152,834 A | 11/2000 | Sullivan |
| 6,152,835 A | 11/2000 | Sullivan et al. |
| 6,159,110 A * | 12/2000 | Sullivan et al. ............. 473/374 |
| 6,204,331 B1 * | 3/2001 | Sullivan et al. ............. 473/372 |
| 6,277,034 B1 * | 8/2001 | Nesbitt et al. ............... 473/359 |
| 6,303,704 B1 * | 10/2001 | Nesbitt ........................ 525/263 |
| 6,309,314 B1 * | 10/2001 | Sullivan et al. ............. 473/377 |
| 6,379,269 B1 * | 4/2002 | Nesbitt et al. .............. 473/351 |

OTHER PUBLICATIONS

U.S. application No. 09/607,349.
U.S. app. 09/608566.
U.S. app. 09/607620.

* cited by examiner

Primary Examiner—Paul T. Sewell
Assistant Examiner—Alvina A. Hunter, Jr.
(74) Attorney, Agent, or Firm—Swidler Berlin Shereff Friedman, LLP

(57) ABSTRACT

A golf ball with core composition comprising polybutadiene, zinc oxide, copper and a metal salt of a material selected from the group consisting of diacrylates, dimethacrylates and monomethacrylates is described. The amount of the copper is sufficient to reduce the compression of a molded golf ball core by at least about 5 compression points compared to a molded core consisting of the same mixture wherein at least one other filler is substituted in place of the copper.

19 Claims, No Drawings

US 6,623,380 B2

1

GOLF BALL CORE COMPOSITION HAVING COPPER

FIELD OF THE INVENTION

This invention generally relates to golf balls, and, in particular, is directed to a composition used for the manufacture of golf ball cores comprising copper, as well as a method for the manufacture of golf ball cores using the subject composition.

BACKGROUND OF THE INVENTION

Golf balls have greatly evolved since the introduction of the first such ball, a leather sack stuffed with goose feathers. Golf ball design and technology have now advanced to the point that the United States Golf Association (USGA), the organization that sets the rules of golf in the United States, has instituted a rule that prohibits the competitive use in any USGA sanctioned event of a golf ball that can achieve an initial velocity of 76.2 meters per second (m/s), or 250 ft/s, when struck by a driver with a velocity of 39.6 m/s, i.e., 130 ft/s (referred to hereinafter as "the USGA test"). However, an allowed tolerance of two percent permits manufacturers to produce golf balls that achieve an initial velocity of 77.7 m/s (255 ft/s).

The technology does exist to produce "hot" golf balls that exceed 77.7 m/s (255 ft/s) by a wide margin in the USGA test, and such hot balls are available. However, these hot balls are not sanctioned for USGA tournaments, or for establishing a USGA handicap. Therefore, manufacturers place a great deal of emphasis on producing golf balls that consistently achieve the highest possible velocity in the USGA test without exceeding the 77.7 m/s (255 ft/s) limit, which are available with a range of different properties and characteristics, such as spin, compression, "click," and "feel." Thus, a variety of different balls is available to meet the needs and desires of a wide range of golfers.

Today, golf balls are generally available as one-piece (i.e., unitary), two-piece, and three-piece (i.e., wound or solid multi-component) balls. One-piece balls lack a cover, and are typically formed with a dimpled surface from a molded polybutadiene based compound. Since these balls typically spin at a high rate, and have a low velocity, they do not provide the desired distance, and are generally used as practice or driving range balls.

In contrast, two-piece golf balls, used by the typical amateur golfer, provide maximum durability and distance. These balls have a core formed of a single solid sphere, which is typically formed of a polybutadiene based compound, and a cover of SURLYN® or other similar ionomer that encloses the core.

Three-piece wound balls, which are preferred by professionals and low handicap amateur golfers for their spin characteristics and feel, include either a solid rubber or a liquid center that is covered by many meters of elastic windings. Such cores are thereafter encased in a cover formed of SURLYN®, polyurethane, or balata rubber. The winding provides three-piece balls with a higher spin rate and more control.

To meet the needs of golfers having varying levels of skill, golf ball manufacturers are continually searching for new ways in which to provide golf balls that deliver the maximum performance for golfers of all skill levels, and seek to discover compositions that provide the performance previously associated with high compression ball in balls with the lower compression desired by amateur golfers.

2

A number of polymers, such as polybutadiene, natural rubber, styrene butadiene, and isoprene, are commonly used in fabricating golf ball cores. Today, golf ball cores are predominantly made of polybutadiene. Moreover, to obtain the desired physical properties for golf balls, manufacturers have added cross-linking agents, such as metallic salts of an unsaturated carboxylic acid. The amount of cross-linking agent added is typically about 10 to 50 parts per hundred parts of polybutadiene. Most commonly, zinc diacrylate or zinc dimethacrylate are used for this purpose. Of these two cross-linkers, zinc diacrylate is preferred.

Typically, about 5 to 50 pph (parts per hundred) of zinc oxide (ZnO) is also added to the composition. This material serves as both a filler and an activation agent for the zinc diacrylate/peroxide cure system. The zinc diacrylate/peroxide cure system, which is well known to those of ordinary skill in this art, cross-links the polybutadiene during the core molding process. The high specific gravity of zinc oxide (5.57) can serve the dual purposes of adjusting the weight of the golf ball, in addition to acting as an activation agent.

The specific gravity of copper (8.94 g/cc) makes it a potential weight modifier for use in polybutadiene compounds. Many different patents and golf ball manufacturers allude to the use of copper in the core as a density modifier. For example, U.S. Pat. Nos. 6,152,835; 6,152,834; 6,149,536 to Sullivan et al.; U.S. Pat. No. 6,123,629 to Yamaguchi et al.; U.S. Pat. No. 6,121,357 to Yokota; U.S. Pat Nos. 6,083,119; 6,018,003; 6,015,356 to Sullivan et al.; U.S. Pat. No. 5,998,506 to Nesbitt; U.S. Pat. No. 5,971,870 to Sullivan et al.; U.S. Pat. Nos. 5,779,562; 5,779,561 to Melvin et al. and U.S. Pat. No. 4,863,167 to Matsuki et al. disclose the use of copper, and many other metals, as a core density modifier. However, none of these patents disclose or suggest any use of copper other than as a core density modifier.

U.S. Pat. Nos. 6,126,559; 6,117,025 and 5,883,553 to Sullivan et al. disclose the use of copper, among many other metals, as a filler to adjust the gravity of any layer (cover, intermediate, and/or core layer) of the golf ball. Again, none of these patents mention any other use of copper.

U.S. Pat. No. 6,136,906 to Sumitomo discloses the use of a metal salt of a higher fatty acid as a dispersing agent with zinc acrylate. Copper is cited as one of potential metal salts. There is no disclosure of copper being used in its elemental form in U.S. Pat. No. 6,136,906.

U.S. Pat. No. 4,852,884 to Sullivan et al. discloses the use of cations, including $Cu^{2+}$, with carbamate in core formulations to improve core properties. There is no disclosure of copper being used in its elemental form in U.S. Pat. No. 4,852,884.

U.S. Pat. No. 4,688,801 to Reiter discloses the use of copper, among several metals, as an improved metal salt for curing rubber. There is no disclosure of copper being used in its elemental form in U.S. Pat. No. 4,688,801.

U.S. Pat. Nos. 4,264,075; 4,165,877 to Miller et al.; U.S. Pat. No. 4,076,255 to Moore et al.; U.S. Pat. No. 4,065,537 to Miller et al. and U.S. Pat. No. 4,056,269 to Pollitt et al. discloses copper, and several other metals, as a potential metal salt of an unsaturated carboxylic acid for use as cross linkers in rubber formulations. There is no disclosure of copper being used in its elemental form in either U.S. Pat. Nos. 4,264,075; 4,165,877; 4,076,255; 4,065,537 or 4,056,269.

U.S. Pat. Nos. 5,143,957 and 5,093,402 to Hashimoto et al. claims metal salts, including copper of α, β-ethylenically unsaturated carboxylic acids that improve golf ball core properties. The preferred α,β-ethylenically unsaturated carboxylic acid is zinc dimethacrylate. There is no disclosure of copper being used in its elemental form in either U.S. Pat. Nos. 5,143,957 or 5,093,402.

Co-pending and co-assigned application Ser. No. 09/607,349 recites the use of copper powder as a density adjusting filler in a layer of a golf ball comprising a saponified polymer/polyamide blend. Co-pending and co-assigned application Ser. No. 09/607,620 recites the use of copper powder as a density adjusting filler in the core layer of a golf ball comprising at least one saponified polymeric material. Co-pending and co-assigned application Ser. No. 09/608,566 recites the use of copper powder as a density adjusting filler in a layer of a golf ball formed of a polymer blend comprising at least one oxa ester or a blend of at least one saponified polymeric material and at least one oxa ester. Neither application Ser. No. 09/607,349; 09/607,620 nor 09/608,566 disclose a requirement that the amount of copper be sufficient to reduce the compression of a molded golf ball core by at least about 5 compression points compared to a molded core consisting of the same mixture wherein at least one other filler is substituted in place of the copper.

The preparation of golf balls with cores with lower compression, i.e., a softer ball, while having the same or higher resilience than conventional cores, is desired. During trial work to study the effectiveness of copper as a density modifier it was discovered that copper is not necessarily an inert filler. Unexpectedly, it was found that copper reduces the compression of the resultant finished core while maintaining a relatively high coefficient of restitution. By adjusting the levels of copper in tandem with the levels of other fillers (to maintain proper weight), free radical initiator levels, and cross linking agent levels, an improved golf ball core can be made. The benefits of copper can be seen by adjusting all three factors or each factor individually.

SUMMARY OF THE INVENTION

The present invention is directed, in a first embodiment, to a composition for the manufacture of golf balls, and, in particular, golf ball cores. The golf ball core comprises at least one layer of a material that is a mixture comprising: (1) polybutadiene, (2) elemental copper, in an amount greater than 0.1 parts per 100 parts of polybutadiene, (3) a metal salt of a monomethacrylate, diacrylate or dimethacrylate, in an amount of about 10 to 50 parts per hundred parts of polybutadiene, (4) a free radical initiator and (5) zinc oxide.

Preferably, the metal salt of a monomethacrylate, diacrylate or dimethacrylate is zinc diacrylate.

Preferably, the amount of elemental copper is from about 1 to 50 parts per 100 parts of polybutadiene. Preferably, the amount of copper is sufficient to reduce the compression of a molded golf ball core by at least about 5 compression points compared to a molded core consisting of the same mixture wherein at least one other filler is substituted in place of the copper. More preferably, the amount of copper is sufficient to reduce the compression of a molded golf ball core by at least about 5 to 20 compression points compared to a molded core consisting of the same mixture wherein at least one other filler is substituted in place of the copper. Preferably, the at least one other filler is an inert filler. In the present invention, the at least one other filler substituted in place of copper is not zinc oxide.

It has been found that when adding copper to the core composition, a golf ball core is obtained, which, when incorporated into a finished golf ball, provides a ball with an initial velocity in the USGA test that is comparable in velocity and distance to a standard ball that incorporates a core using existing well known fillers, such as zinc stearate, polypropylene, tin oxide, calcium oxide, barium sulfate, tungsten, iron, tantalum oxide, regrind, limestone and mixtures thereof. Further, it was also unexpectedly found that copper reduced the compression of a molded golf ball core by at least about 5 compression points in comparison to a molded core consisting of the same mixture wherein at least one other filler is substituted in place of the copper. Preferably, copper reduced the compression of a molded golf ball core by at least about 5 to 20 compression points in comparison to a molded core consisting of the same mixture wherein at least one other filler is substituted in place of the copper. Typically, the amount of copper incorporated into the core composition of the invention is between about 0.1 and 50 parts per 100 parts of polybutadiene. The amount of copper used is preferably less than about 50 pph because when more than 50 pph is used, the ball is too heavy.

Preferably, the ratio of elemental copper to the at least one other filler is between 95:5 and 5:95. Preferably, the at least one other filler is selected from the group consisting of zinc stearate, polypropylene, tin oxide, calcium oxide, barium sulfate, tungsten, iron, tantalum oxide, regrind, limestone and mixtures thereof.

Preferably the polybutadiene has a cis-1,4-polybutadiene content of at least about 90%. More preferably, the polybutadiene has a cis-1,4-polybutadiene content of at least about 96%.

Preferably the free-radical initiator is present in an amount of up to 12 parts per 100 parts of polybutadiene, preferably from about 0.4 to 8 parts per 100 parts of polybutadiene. Most preferably, the free radical initiator is present in an amount 0.5 to 2 parts per 100 parts of polybutadiene.

In a further embodiment, the inner core of a two-piece core comprises a composition of the present invention and the outer core comprises polybutadiene, zinc oxide, a metal salt of a material selected from the group consisting of diacrylates, dimethacrylates and monomethacrylates and tungsten. Preferably, the overall diameter of the two-piece core is less than or equal to 1.64 inches. Preferably, the inner core of the two-piece core has a diameter less than or equal to about 1.60 inches. More preferably, the diameter of the inner core is less than or equal to 1.25 inches. Most preferably, the diameter of the inner core is less than or equal to 1 inch.

In another embodiment, the outer core of a two-piece core comprises a composition of the present invention and the inner core comprises polybutadiene, zinc oxide, a metal salt of a material selected from the group consisting of diacrylates, dimethacrylates and monomethacrylates and tungsten. Preferably, the copper-containing outer core has a thickness less than or equal to 0.5 inch. More preferably, the thickness of the outer core is less than or equal to 0.3 inch.

The present invention is further directed to a method of making a golf ball core composition that provides a lower compression molded golf ball core with an initial velocity comparable to a higher compression ball core, as well as to a product of such a method. The method of the invention comprises forming a first mixture, comprising: (1) polybutadiene, (2) a metal salt diacrylate, dimethacrylate, or monomethacrylate, preferably zinc diacrylate, (3) zinc oxide, and (4) elemental copper, in an amount of about 0.1 to 50 parts per 100 parts of polybutadiene and sufficient to produce a molded golf ball core having reduced compression, while maintaining the initial velocity of a golf ball core incorporating fillers other than copper. Preferably, the amount of copper is sufficient to reduce the compression of a molded golf ball core by at least about 5 compression points compared to a molded core consisting of the same mixture wherein other fillers are substituted in place of the copper. More preferably, the amount of elemental copper is sufficient to reduce the compression of a molded golf ball core by at least about 5 to 20 compression points compared to a molded core consisting of the same mixture wherein other fillers are substituted in place of the copper. Preferably, the metal salt is in an amount from about 10 to 50 parts per 100 parts of polybutadiene. In the present invention, the filler substituted in place of copper is not zinc oxide.

The elemental copper is preferably added to a mixture of polybutadiene and metal salt diacrylate, dimethacrylate, or monomethacrylate after the polybutadiene and metal salt are thoroughly blended. Alternatively, however, the elemental copper may also be placed in a mixer with polybutadiene and a metal salt diacrylate, dimethacrylate, or monomethacrylate, so that the three components are blended simultaneously.

Preferably the polybutadiene has a cis-1,4-polybutadiene content of at least about 90%. More preferably, the polybutadiene has a cis-1,4-polybutadiene content of at least about 96%.

Preferably, the method of making a golf ball core composition further comprises molding the golf ball core composition into a unitary golf ball.

Typically, as the polybutadiene, zinc oxide, metal diacrylate, dimethacrylate or monomethacrylate and elemental copper are mixed, the temperature of the mixture is from about 76° to about 93.3° C. (168.8–200 F). Preferably, the temperature of the mixture is 82.2° to about 87.8° C. (180–190 F). More preferably, the temperature is 83.3° C. (182 F).

At least one free radical initiator is then added to the mixture. Preferred initiators are peroxide initiators, which are well known in the art of golf ball manufacturing. Preferably the free-radical initiator is present in an amount of up to 12 parts per 100 parts of polybutadiene, preferably from about 0.4 to 8 parts per 100 parts of polybutadiene. Most preferably, the free radical initiator is present in an amount 0.5 to 2 parts per 100 parts of polybutadiene. Suitable peroxides are well known to those of ordinary skill in the art and may be readily selected for use in the invention.

The temperature at which the free radical initiator should be added is readily apparent to one of ordinary skill in the art without the need for any experimentation. In the case of peroxides, for example, the addition temperature depends upon the peroxide chosen. Peroxides may be added with the initial charge at a temperature as low as 80° F., or alternately at a temperature just short of the vulcanization temperature for the resultant admixture. The admixture containing the initiator is then blended to form a homogeneous mixture, which is discharged and molded into golf ball cores.

In a further embodiment, the present invention is directed to a golf ball comprising a cover and a core, wherein the core is formed from a mixture, said mixture comprising: (1) polybutadiene, (2) a metal salt of a material selected from the group consisting of diacrylates, dimethacrylates, and monomethacrylates, (3) zinc oxide and (4) elemental copper, wherein the amount of the elemental copper is sufficient to reduce the compression of a molded golf ball core by at least about 5 compression points compared to a molded core consisting of the same mixture wherein at least one other filler is substituted in place of the elemental copper. Preferably, the amount of copper is sufficient to reduce the compression of a molded golf ball core by at least about 5 to 20 compression points compared to a molded core consisting of the same mixture wherein at least one other filler is substituted in place of the copper. Preferably, the amount of copper in said mixture is from about 0.1 to 50 parts per 100 parts of polybutadiene. Preferably, the amount of the metal salt in said mixture is about 10 to 50 parts per 100 parts of polybutadiene. Preferably, the metal salt is zinc diacrylate.

Preferably, the polybutadiene has a cis-1,4-polybutadiene content of at least about 90%. More preferably, the polybutadiene has a cis-1,4-polybutadiene content of at least about 96%.

In the present invention, the filler substituted in place of copper is not zinc oxide. Preferably, the at least one other filler is selected from the group consisting of zinc stearate, polypropylene, tin oxide, calcium oxide, barium sulfate, tungsten, iron, tantalum oxide, regrind, limestone, and mixtures thereof.

DETAILED DESCRIPTION OF THE PREFERRED EMBODIMENTS

As used herein, the terms "core" and "golf ball core" are generic, and include one-piece or unitary golf balls, cores for two-piece golf balls, dual cores for three or more-piece golf balls, and centers for wound golf balls and the like. The core composition of the present invention can be used to form a unitary golf ball, a core for a two-piece golf ball, or a core for a three-piece or wound golf ball, as desired.

As used herein, the term "center" is the core in a two-piece golf ball and the term "center" in a three or more-piece golf ball is the inner core.

As used herein, the term "fillers" includes any compound or composition that can be used to vary the density and other properties of the subject golf ball core. As used herein, the term "other filler" means a filler that is not zinc oxide. Examples of other prior art fillers are zinc stearate, polypropylene, tin oxide, calcium oxide, barium sulfate, tungsten, iron, tantalum oxide, regrind, limestone, and mixtures thereof. As used herein, the term "regrind" means recycled core molding matrix typically ground to about 30 mesh or less particle size. As used herein, the term "inert filler" means a material that does not react with other materials in the core.

Methods for measuring resiliency of golf balls are well known by those skilled in the art. One method of measuring the resiliency of a golf ball at impact is to utilize an air cannon or other means of propelling a ball at velocities equivalent to those of the golf ball club head. The balls are fired at a massive rigid block and the inbound and outbound velocities are measured. The velocity may be measured by the use of light screens, which measure the time required for the ball to travel a fixed distance. The fixed distance is divided by the transit time is equivalent to the average velocity of the ball over the fixed distance. As used herein, the term "coefficient of restitution" (CoR) is the ratio of the outbound velocity to the inbound velocity. The CoR is a direct measure of the resilience of a golf ball at a particular inbound velocity. Since golf balls behave in a linear-viscoelastic fashion, inbound ball velocity is functionally equivalent to club swing speed, which is set in the standardized CoR test at about 125 ft./sec.

As used herein, the terms "points" or "compression points" refer to the PGA or Atti compression scale. This scale, which is well known to those working in this field, ranges from 1 to 160 points and is used in determining the relative compression of a core or ball. Some skilled artisans who do not use the PGA compression scale instead use Reihle compression values. Reihle compression values have been reported by others to be converted to PGA compression values through the use of the following equation:

PGA compression value=160−Reihle compression value.

As used herein, the term "parts per hundred", also known as "pph", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

A representative base composition for forming golf ball cores, prepared in accordance with the present invention, comprises: (1) polybutadiene and (2) 10–50 parts per 100 parts of polybutadiene of a metal salt diacrylate, dimethacrylate, or monomethacrylate. Preferably, the metal salt acrylate is zinc diacrylate. The polybutadiene preferably has a cis 1,4 content of above about 90% and more preferably above about 96%. Commercial sources of polybutadiene include Shell 1220 manufactured by Shell Chemical, Neocis BR40 manufactured by Enichem Elastomers, Ubepol BR150 manufactured by Ube Industries, Ltd. and Buna CB23 manufactured by Bayer. Preferably the polybutadiene is Buna CB23. If desired, the polybutadiene can also be mixed with other elastomers known in the art, such as natural rubber, styrene butadiene, and/or isoprene in order to further modify the properties of the core. When a mixture of elastomers is used, the amounts of other constituents in the core composition are based on 100 parts by weight of the total elastomer mixture.

Metal salt diacrylates, dimethacrylates, and monomethacrylates suitable as crosslinking agents for use in this invention include those wherein the metal is magnesium, calcium, zinc, aluminum, sodium, lithium or nickel. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the polymer component, preferably from about 10 to 50 percent of the polymer component, more preferably from about 10 to 30 percent of the polymer component.

Most preferably, the metal salt diacrylate is zinc diacrylate because it provides golf balls with a high initial velocity in the USGA test. The zinc diacrylate can be of various grades of purity. For the purposes of this invention, the lower the quantity of zinc stearate present in the zinc diacrylate, the higher the zinc diacrylate purity. Zinc diacrylate containing about 1–10% zinc stearate is preferable. More preferable is zinc diacrylate containing about 4–8% zinc stearate. Suitable, commercially available zinc diacrylates include those from Sartomer. The preferred concentrations of zinc diacrylate that can be used are 10–50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to, peroxide compounds and mixtures thereof. Preferably, the peroxide is an organic peroxide. Suitable free-radical peroxides include di-t-amyl peroxide, di(2-t-butyl-peroxyisopropyl)benzene peroxide, 1,1-di(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, di-(2-t-butylperoxyisopropyl) benzene and the like, and any mixture thereof. Most preferably the free radical initiator is Trigonox 265-50B. Trigonox 265-50B is a mixture of Varox 231 XL, also known as 1,1-di(t-butylperoxy)-3,3,5-trimethycyclohexane and DBDB-60, also known as di(2-t-butylperoxyisopropyl) benzene. Trigonox 265-50B is available from Akzo Nobel.

The free radical source may alternatively or additionally be one or more of an electron beam, UV or gamma radiation, x-rays, or any other high energy radiation source capable of generating free radicals. It should be further understood that heat often facilitates initiation of the generation of free radicals.

Other useful initiators are also readily apparent to one of ordinary skill in the art without any need for experimentation. The initiator(s) at 100% activity are preferably added in an amount up to 12 parts per 100 parts of polybutadiene, or polybutadiene mixed with one or more other elastomers. More preferably the amount of free radical initiator is added from about 0.4 to 8 parts per 100 parts of polybutadiene. Most preferably, the free radical initiator is present in an amount 0.5 to 2 parts per 100 parts of polybutadiene.

Unexpectedly, it has been found that the use of elemental copper in tandem with zinc oxide yields a softer core with comparable CoR numbers to harder, non-copper cores. The elemental copper may be in the form of powder, flakes, grains, fibers and/or filings. Preferably, the elemental copper is in powder form. Preferably, the particle size of elemental copper is less than or equal to 50 microns. More preferably, the particle size is less than or equal to 10 microns. Most preferably, the particle size is less than or equal to 5 microns.

Trials have shown that adding 1 to 5 pph of elemental copper to a standard batch lowers the compression of the molded golf ball core between five to forty compression units while only decreasing the CoR by 0.0005 to 0.02 units. Soft compressions and relatively high CoR values can also be attained by using elemental copper as the sole weight modifier and varying peroxide, zinc oxide and zinc diacrylate levels. Experiments have shown that a 0 compression molded golf ball core can have a CoR value between 0.750 and 0.767 simply by using elemental copper and variable peroxide levels. Prior to this discovery the only way known to attain 0 compression cores with 0.740 to 0.750 CoR's was through the conversion of cis-isomer to the trans-isomer in the polybutadiene. The conversion of the cis-isomer to the trans-isomer of polybutadiene is described, for example, in U.S. Pat. No. 6,162,135 to Bulpett et al.

The compositions of the present invention may also include fillers, added to the elastomeric composition to adjust the density and/or specific gravity of the core. Fillers may also include various foaming agents or blowing agents which may be readily selected by one of ordinary skill in the art. Foamed polymer blends may be formed by blending blowing agent(s) with polymer material, as is well known by those of ordinary skill in the art. Polymeric, ceramic, metal, or glass micro spheres, or combinations thereof, may be used to adjust the density or other properties of a given layer, and such microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Other fillers useful in the golf ball core according to the present invention include, for example, zinc stearate, polypropylene, tin oxide, calcium oxide, tantalum oxide, iron, tungsten, tungsten carbide, barium sulfate, zinc sulfate, and regrind (which is recycled core molding matrix typically ground to about 30 or less mesh particle size). The amount and type of filler utilized is governed by the amount and weight of other ingredients in the composition, since a maximum golf ball weight of 1.620 ounces (45.92 gm) has been established by the USGA. Appropriate fillers generally used range in specific gravity from about 1.0 to 15.0. The fillers, when used, are typically present in an amount from about 5 to 80 pph, preferably from about 10 to 60 pph, and more preferably from about 40 to 50 pph, of the resilient polymer component in the center.

The golf ball may also include blends with conventional cis-polybutadiene polymers or other resilient polymers. Additional resilient polymers suitable for use with the polybutadiene component of the invention when preparing the ball core include conventional cis-polybutadienes that typically contain greater than about 40 percent cis-content, polyisoprene, styrene-butadiene, styrene-propylene-diene rubber, ethylene propylene-diene rubber (EPDM), mixtures thereof, and the like. The additional resilient polymer is preferably polyisoprene or conventional polybutadiene, more preferably conventional polybutadiene. One example of a suitable conventional cis-polybutadiene for inclusion in the material is CARIFLEX BR 1220, commercially available from H. MUEHLSTEIN & CO., INC. of Norwalk, Conn. The optional resilient polymer component has a high molecular weight average, defined as being at least about 50,000 to 1,000,000, preferably from about 150,000 to 750,000, and more preferably from about 200,000 to 400,000. CARIFLEX BR 1220 is believed to have a molecular weight average of about 372,000.

Golf ball cores made according to the present invention can be of any specific gravity which can be used in a golf ball. The preferred range of specific gravities of the present invention is from about 0.9 to about 1.5 or more, more preferably in the range of about 1 to about 1.25, depending upon the size of the core, cover, and finished ball, as well as the specific gravity of the cover.

Antioxidants may also be included in the elastomer cores produced according to the present invention. Antioxidants are compounds which prevent the breakdown of the elastomer. Antioxidants useful in the present invention include, but are not limited to, quinoline type antioxidants, amine type antioxidants, and phenolic type antioxidants.

Other ingredients such as accelerators, e.g. tetra methylthiuram, processing aids, processing oils, plasticizers, dyes and pigments, as well as other additives well known to the skilled artisan may also be used in the present invention in amounts sufficient to achieve the purpose for which they are typically used.

The compositions of the invention are typically produced by forming a mixture comprising polybutadiene, zinc oxide, zinc diacrylate, and an amount of elemental copper sufficient to reduce the compression of a molded golf ball core by at least about 5 compression points compared to a molded core composition substituting at least one other filler for the elemental copper, optionally with one or more additional components, such as additives. Preferably, the amount of copper is sufficient to reduce the compression of a molded golf ball core by at least about 5 compression points compared to a molded core consisting of the same mixture wherein at least one other filler is substituted in place of the copper. More preferably, the amount of copper is sufficient to reduce the compression of a molded golf ball core by at least about 5 to 20 compression points compared to a molded core consisting of the same mixture wherein at least one other filler is substituted in place of the copper. When a set of predetermined conditions is met, i.e., time and temperature of mixing, the free radical initiator is added in an amount dependent upon the amounts and relative ratios of the starting components, as would be well understood by one of ordinary skill in the art. In particular, as the components are mixed, the resultant shear causes the temperature of the mixture to rise. Peroxide(s) free radical initiator(s) are blended into the mixture for crosslinking purposes in the molding process.

A single-pass mixing process where ingredients are added sequentially is preferred, as this type of mixing tends to increase efficiency and reduce costs for the process. The preferred mixing cycle is single step wherein the polymer, elemental copper, zinc oxide, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking. The mixing temperature depends upon the type of polymer components, and more importantly, on the type of free-radical initiator. For example, if dicumyl peroxide is selected as the peroxide, the temperature should not exceed 93° C. Suitable mixing speeds and temperatures are well-known to those of ordinary skill in the art, or may be readily determined without undue experimentation.

After completion of the mixing, the golf ball core composition is milled and hand prepped or extruded into pieces ("preps") suitable for molding. The milled preps are then compression molded into cores at an elevated temperature. Typically, 160° C. (320° F.) for 15 minutes is suitable for this purpose. In addition to compression molding, the golf ball core composition may also be manufactured by injection, or transfer molding techniques. A fluid-filled center may alternatively be formed instead of a solid center. Any additionally desired center layers may then be added to the center by conventional compression or injection molding techniques, preferably in a concentric fashion to maintain a substantially spherical center.

As one embodiment, the golf ball core composition of the present invention may be molded into a unitary golf ball. However, the cores of the present invention may also be used to make finished golf balls by surrounding the centers with standard cover materials.

Any conventional material or method may be used in preparing the golf ball cover disposed over the core. For example, as is well known in the art, ionomers, balata, and urethanes are suitable golf ball cover materials. Preferably, the ionomer is SURLYN® ionomer resin. A variety of less conventional materials may also be used for the cover, e.g., thermoplastics such as ethylene- or propylene-based homopolymers and copolymers. These homopolymers and copolymers may also include functional monomers such as acrylic and methacrylic acid, fully or partially neutralized ionomers and their blends, methyl acrylate, methyl methacrylate homopolymers and copolymers, imidized amino group-containing polymers, polycarbonate, reinforced polycarbonate, reinforced polyamides, polyphenylene oxide, high impact polystyrene, polyether ketone, polysulfone, poly(phenylene sulfide), acrylonitrile-butadiene, acrylic-styrene-terephthalate, poly(ethylene terephthalate), poly(trimethylene terephthalate), poly(butylene terephthalate), poly(ethylene-vinyl alcohol), poly(tetrafluoroethylene), and the like. Any of these polymers or copolymers may be further reinforced by blending with a wide range of fillers, including glass fibers or spheres, or wood pulp. The selection of a suitable cover will be readily determinable by those of ordinary skill in the art when considering the disclosure herein.

F.). The peroxides were added in the second stage to the initial mixture, and the resulting mixture was removed from the Brabender and blended on a lab mill to insure homogeneity. After mixing, the admixture was then hand rolled using a laboratory mill and cut into pieces or "preps". These preps were then compression molded at 160° C. (320° F.) for 15 minutes to form the cores.

The cores and balls prepared according to the above-described method were tested for their compression and coefficient of restitution (CoR). The compression ratings were obtained using a commercial Atti PGA compression tester. The CoR results were obtained by utilizing an air cannon or other means of propelling a ball at velocities equivalent to those of the golf ball club head. The balls are fired at a massive rigid block and the inbound and outbound velocities are measured. The velocity is measured by the use of light screens, which measures the time required for the ball to travel a fixed distance. The fixed distance divided by the transit time is equivalent to the average velocity of the ball over the fixed distance. The coefficient of restitution (CoR) is the ratio of the outbound velocity to the inbound velocity.

TABLE 1

| Constituents (pph) | Control | 1 Comparative Example | 2 Comparative Example | 3 | 4 | 5 | 6 | 7 | 8 | 9 | 10 | 11 | 12 |
|---|---|---|---|---|---|---|---|---|---|---|---|---|---|
| Polybutadiene | 100 | 100 | 100 | 100 | 100 | 100 | 100 | 100 | 100 | 100 | 100 | 100 | 100 |
| Zinc Oxide | 4.89 | 4.89 | 4.89 | 4.89 | 4.89 | 4.89 | 4.89 | 4.89 | 4.89 | 4.89 | 4.89 | 4.89 | 4.89 |
| Zinc Diacrylate | 25.5 | 25.5 | 25.5 | 25.5 | 25.5 | 25.5 | 25.5 | 25.5 | 25.5 | 27.5 | 20 | 25.5 | 25.5 |
| BaSO$_4$ | 17.7 | | | | | | | | | | | 16.52 | 11.78 |
| Tungsten | | 14.1 | | | | | | | | | | | |
| Iron | | | 15.23 | | | | | | | | | | |
| Copper | | | | 14.93 | 14.86 | 14.79 | 14.72 | 14.64 | 14.57 | 14.13 | 16.63 | 1 | 5 |
| Trigonox 265-50B | 0.53 | 0.53 | 0.53 | 0.53 | 1 | 1.5 | 2 | 2.5 | 3 | 1.25 | 2 | 0.53 | 0.53 |
| Core compression* | 77.7 | 68.3 | 74 | 0 | 24 | 34.6 | 42.6 | 42.4 | 47.8 | 43.3 | 0 | 63.7 | 31.7 |
| Core CoR | 0.806 | 0.806 | 0.804 | 0.753 | 0.773 | 0.772 | 0.772 | 0.769 | 0.765 | 0.777 | 0.7674 | 0.794 | 0.788 |

*Compression is provided in PGA units.

EXAMPLES

These and other aspects of the present invention may be more fully understood with reference to the following non-limiting examples, which are merely illustrative of the preferred embodiments of the present invention, and are not to be construed as limiting the invention, the scope of which is defined by the appended claims.

The results obtained with golf ball cores and balls prepared according to the following examples are representative of the improved performance characteristics of golf ball cores and golf balls made from the compositions of this invention. The compositions used to prepare the golf balls of these examples contained the ingredients listed in TABLE I below in the specified amounts, which are all in parts per hundred (pph), based on 100 parts of polybutadiene. The fillers used in the compositions of these examples are barium sulfate (BaSO$_4$), W, Fe and copper (Cu). Zinc oxide is used as an activation agent. Trigonox 265-50B is the free radical initiator and is a mixture of Varox 231 XL and DBDB-60. Varox 231 XL (CAS #6731-36-8) is 1,1-di(t-butylperoxy)-3,3,5-trimethycyclohexane. DBDB-60 (CAS# 25155-25-3) is di(2-t-butylperoxyisopropyl)benzene. Zinc diacrylate is the cross-linking agent and contains no more than about 4–8% zinc stearate.

All the ingredients except the peroxides were mixed in a Process Lab Brabender mixer to 82.2°–93.3° C. (180°–200°

Examples 1–2

Examples 1 and 2 are comparative examples. Example 1 discloses a golf ball were tungsten is used as the filler instead of copper. Example 2 discloses a golf ball were iron is used as the filler instead of copper.

Examples 3–12

Examples 3–12 are examples of the present invention disclosing golf balls where the core compression ranges from 0 to 63.7.

In one embodiment of the present invention, the composition of one of the examples of the present invention is utilized as the inner core of a 2-piece core where the inner core has a diameter less than or equal to 1.25 inches. More preferably, the diameter is less than or equal to 1 inch.

In another embodiment of the present invention, the composition of one of the examples of the present invention is utilized as the outer core of a 2-piece core. Preferably, the thickness of the outer core is less than or equal to 0.5 inch. More preferably, the thickness of the outer core is less than or equal to 0.3 inch.

In another embodiment of the present invention, a golf ball is made, comprising a cover and one or two layers of the composition of Example 11, where the diameter of the golf ball core is from about 1.5 to about 1.62 inches.

In another embodiment of the present invention, a golf ball is made comprising a cover and one or two layers of the composition of Example 12 in the core, where the diameter of the golf ball core is from about 1.5 to about 1.62 inches.

In another embodiment of the present invention, a golf ball is made where the inner core of the two-piece golf ball core comprises a composition of Example 3 with a outer core comprising a composition of Example 1. Preferably, the inner core of the golf ball has an outer diameter from about 0.5 to about 1.3 inches.

In another embodiment of the present invention, a golf ball core with an outer diameter from about 0.5 to about 1.3 inches is made where the inner core of the golf ball core comprises a composition of Example 1 with an outer core comprising a composition of Example 3.

The present invention can be used in forming golf balls of any desired size. "The Rules of Golf" by the USGA dictate that the size of a competition golf ball must be at least 1.680 inches in diameter, however, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.70 to about 2.0 inches can be used. Oversize golf balls with diameters above about 1.760 inches to as big as 2.75 inches are also within the scope of the invention.

All patents cited in the foregoing text are expressly incorporated herein by reference in their entirety. It will be understood that the claims are intended to cover all changes and modifications of the preferred embodiments of the invention, herein chosen for the purpose of illustration, which do not constitute a departure from the spirit and scope of the invention.

I claim:

1. A golf ball comprising a cover, art inner core, and an outer core layer, wherein the inner core comprises: (1) polybutadiene, (2) zinc oxidc, (3) a metal salt of a material selected from the group consisting of diacrvlates, dimethacrvlates, monomethacrylates, and mixtures thereof, and (4) tungsten, and wherein the outer core layer has a thiickness of 0.3 inches or less and comprises a mixture comprising: (1) polybutadiene, (2) zinc oxide, (3) a metal salt of a material selected from the group consisting of diacrylates, dimethacrylates, and monomethacrylates, and (4) elemental copper, wherein the amount of the elemental copper is sufficient to reduce the compression of the core by at least about 5 compression points compared to a molded core consisting of the same mixture wherein at least one other filler is substituted in place of the elemental copper.

2. The golf ball of claim 1, wherein the amount of elemental copper in said mixture is greater than 04 parts per 100 parts of polybutadiene.

3. The golf ball of claim 1, wherein the amount of elemental copper in said mixture is from about 1 to 50 parts per 100 parts of polybutadiene.

4. The golf ball of claim 1, wherein the polybutadiene has a cis-1,4-polybutadiene content of at least about 90%.

5. The golf ball of claim 1, wherein the polybutadiene has a -cis-1,4-polybutadiene content of at least about 96%.

6. The golf ball of claim 1, wherein the amount of the metal salt in said mixture is about 10 to 50 parts per 100 parts of polybutadiene.

7. The golf ball of claim 6, wherein the metal salt is zinc diacrylate.

8. The golf ball of claim 1, where the at least one other filler is not zinc oxide.

9. The golf ball of claim 8, wherein the at least one other filler is selected from the group consisting of zinc stearate, polypropylene, tin oxide, calcium oxide, barium sulfate, tungsten, iron, tantalum oxide, regrind, limestone, and mixtures thereof.

10. The golf ball of claim 1, wherein the ratio of elemental copper to the at least one other filler is between 95:5 and 5:95.

11. The golf ball of claim 1, wherein the at least one other filler is an inert filler.

12. The golf ball of claim 1, wherein the core comprises an inner core and outer core and thc outer core comprises: (1) polybutadiene, (2) zinc oxide, (3) a metal salt of a material selected from the group consisting of diacrylates, dimethacrylates and monomethacrylates and (4) tungsten.

13. The golf ball of claim 12, wherein the inner core comprising polybutadiene, a metal salt and elemental copper has a diameter less than or equal to 1.60 inches.

14. The golf ball of claim 13, wherein the inner core has a diameter less than or equal to 1.25 inches.

15. The golf ball of claim 14, wherein the diameter of the inner core is less than or equal to 1 inch.

16. A golf ball comprising a cover and a core, wherein at least one of an inner core layer or an outer core layer is formed of a mixture comprising: (1) polybutadiene, (2) zinc oxide, (3) a metal salt of a material selected from the group consisting of diacrylates, dimethacrylates, and monomethacrylates, and (4) elemental copper, wherein the amount of the elemental copper is sufficient to reduce the compression a molded golf ball core by at least about 5 compression points compared to a molded core consisting of the same mixture wherein at least one other tiller is substituted in place of the elemental copper, and wherein the outer core layer has a thickness of about 03 inches or less.

17. The golf ball of claim 16, wherein the amount of the elemental copper is sufficient to reduce the compression a molded golf ball core by at least about 5 compression points to about 20 compression points compared to a molded core consisting of the same mixture wherein at least one other filler is substituted in place of the elemental copper.

18. The golf ball of claim 16, wherein the metal salt is zinc diacrylate.

19. The golf ball of claim 16, wherein the at least one other filler is selected from the group consisting of zinc stearate, polypropylene, tin oxide, calcium oxide, barium sulfate, tungsten, iron, tantalum oxide, regrind, limestone, and mixtures thereof.

* * * * *

UNITED STATES PATENT AND TRADEMARK OFFICE
CERTIFICATE OF CORRECTION

PATENT NO.   : 6,623,380 B2
DATED        : September 23, 2003
INVENTOR(S)  : Michael D. Jordan It is certified that error appears in the above-identified patent and that said Letters Patent is hereby corrected as shown below:

Column 13,
Line 38, claim 1 should be corrected as follows:
   1. A golf ball comprising a cover, an inner core, and an outer core layer, wherein the inner core comprises: (1) polybutadiene, (2) zinc oxide, (3) a metal salt of a material selected from the group consisting of diacrvlates, dimethacrvlates, monomethacrylates, and mixtures thereof, and (4) tungsten, and wherein the outer core layer has a thickness of 0.3 inches or less and comprises a mixture comprising: (1) polybutadiene, (2) zinc oxide, (3) a metal salt of a material selected from the group consisting of diacrylates, dimethacrylates, and monomethacrylates, and (4) elemental copper, wherein the amount of the elemental copper is sufficient to reduce the compression of the core by at least about 5 compression points compared to a molded core consisting of the same mixture wherein at least one other filler is substituted in place of the elemental copper.

Line 54, claim 2 should be corrected as follows:
   2. The golf ball of claim 1, wherein the amount of elemental copper in said mixture is greater than 0.1 parts per 100 parts of polybutadiene.

Column 14,
Line 33, claim 16 should be corrected as follows:
   16. A golf ball comprising a cover and a core, wherein at least one of an inner core layer or an outer core layer is formed of a mixture comprising: (1) polybutadiene, (2) zinc oxide, (3) a metal salt of a material selected from the group consisting of diacrylates, dimethacrylates, and monomethacrylates, and (4) elemental copper, wherein the amount of the elemental copper is sufficient to reduce the compression a molded golf ball core by at least about 5 compression points compared to a molded core consisting of the same mixture wherein at least one other filler is substituted in place of the elemental copper, and wherein the outer core layer has a thickness of about 0.3 inches or less.

UNITED STATES PATENT AND TRADEMARK OFFICE
CERTIFICATE OF CORRECTION

PATENT NO. : 6,623,380 B2
DATED : September 23, 2003
INVENTOR(S) : Michael D. Jordan It is certified that error appears in the above-identified patent and that said Letters Patent is hereby corrected as shown below:

Column 14 (cont'd),
Line 45, claim 17 should read as follows:
    17. The golf ball of claim 16, wherein the amount of the elemental copper is sufficient to reduce the compression of a molded golf ball core by at least about 5 compression points to about 20 compression points compared to a molded core consisting of the same mixture wherein at least one other filler is substituted in place of the elemental copper.

Signed and Sealed this

Thirtieth Day of August, 2005

JON W. DUDAS
*Director of the United States Patent and Trademark Office*